Sept. 16, 1924.  
T. H. SEELY  
MOLDING MACHINE  
Filed March 24, 1920  
1,508,415  
2 Sheets-Sheet 1
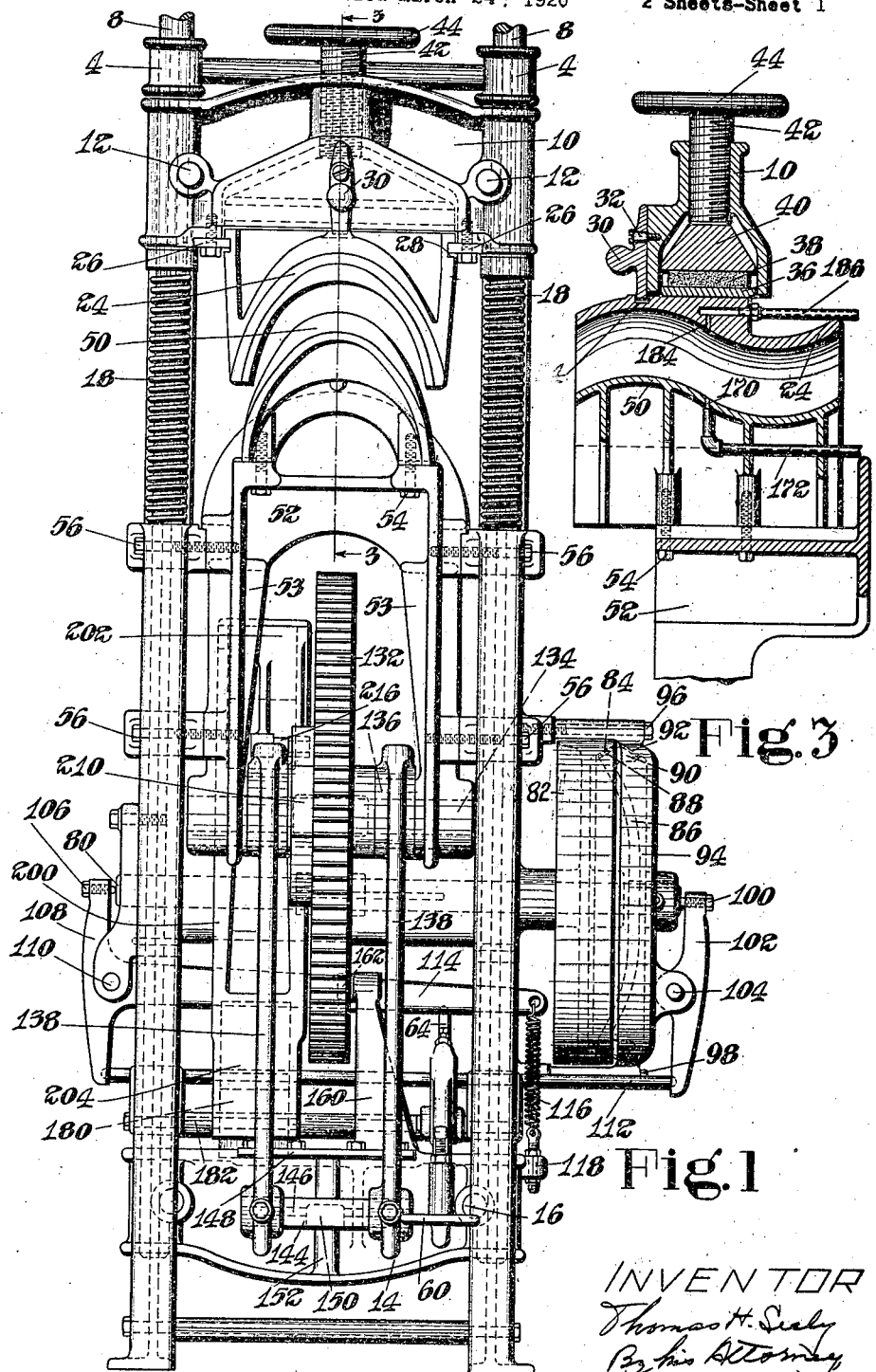

Sept. 16, 1924.
T. H. SEELY
MOLDING MACHINE
Filed March 24, 1920
1,508,415
2 Sheets-Sheet 2
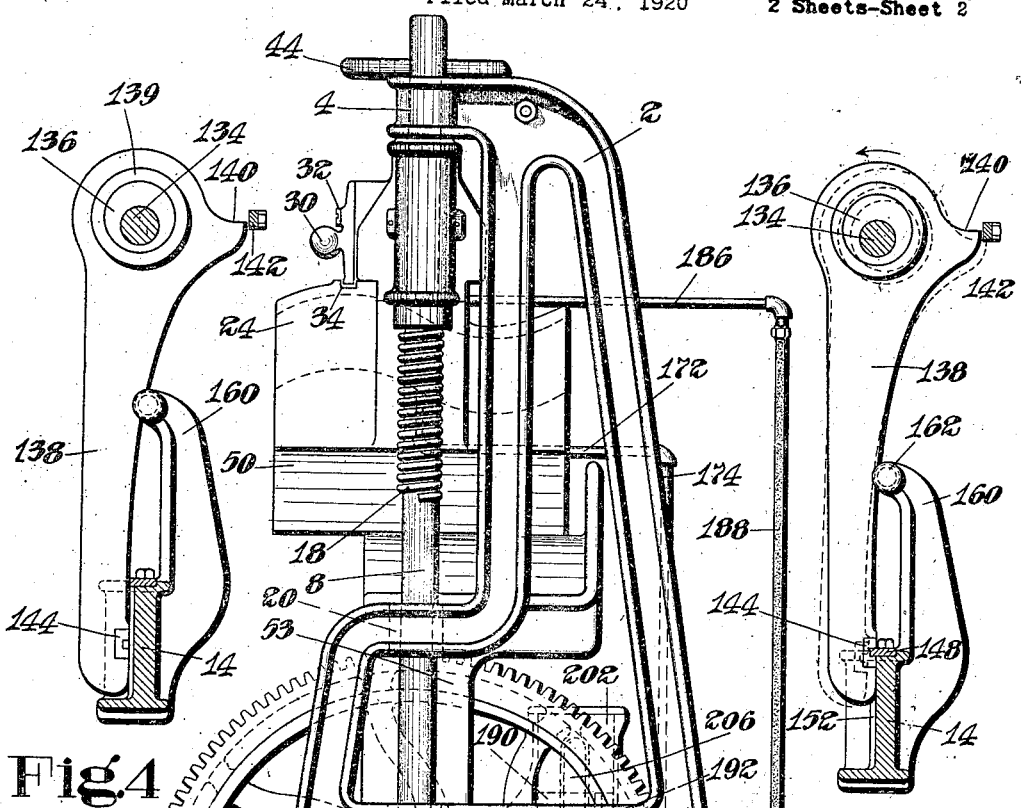
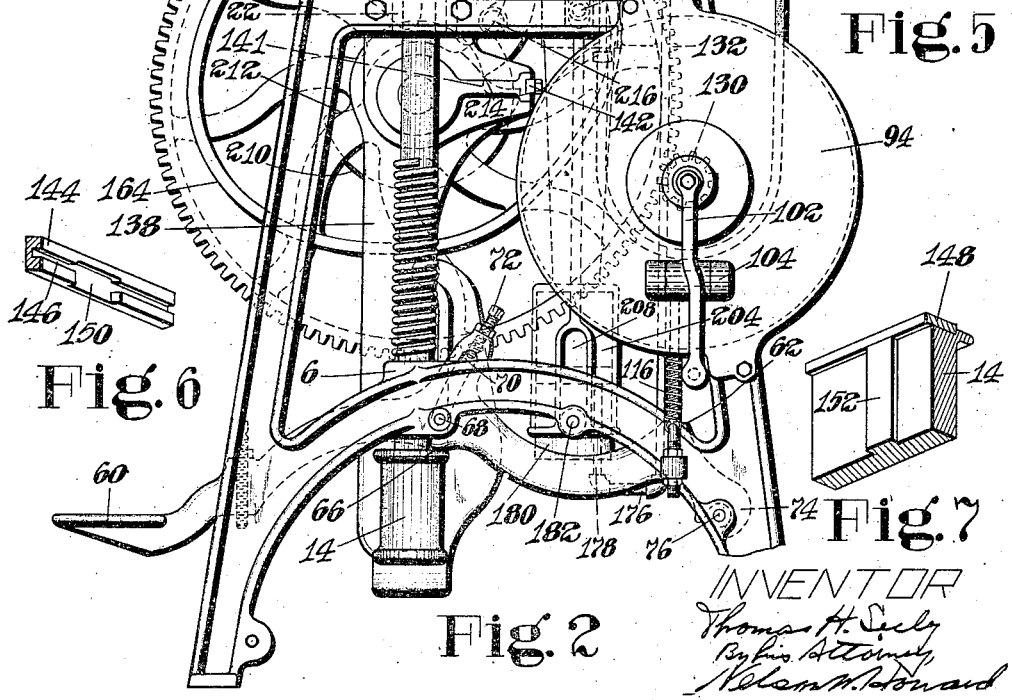
INVENTOR
Thomas H. Seely
By his Attorney
Nelson W. Howard Patented Sept. 16, 1924.

1,508,415

UNITED STATES PATENT OFFICE.

THOMAS H. SEELY, OF MALDEN, MASSACHUSETTS, ASSIGNOR TO UNITED SHOE MACHINERY CORPORATION, OF PATERSON, NEW JERSEY, A CORPORATION OF NEW JERSEY.

MOLDING MACHINE.

Application filed March 24, 1920. Serial No. 368,387.

*To all whom it may concern:*

Be it known that I, THOMAS H. SEELY, a citizen of the United States, residing at Malden, in the county of Middlesex and State of Massachusetts, have invented certain Improvements in Molding Machines, of which the following description, in connection with the accompanying drawings, is a specification, like reference characters on the drawings indicating like parts in the several figures.

This invention relates to molding machines and the machine herein shown and described for the purpose of illustrating one embodiment of the invention is particularly designed for operation upon leather puttees or leggings, although it will be understood that many features of the invention are not limited to such application. It has been the practice to manufacture puttees and leggings by fashioning a piece of leather into cylindrical shape (sewing the adjacent edges together) and then forcing forming blocks by hand into the cylinder thus made in order to give the puttee the proper conformation, these forming blocks being inserted while the leather is wet and the leather being allowed to dry thereon. It has also been the practice to provide a forming block of the desired shape and to press the leather around this block by means of an outer sectional mold having a hand operated clamping device.

One object of the invention is to provide a machine which will eliminate these hand operations and produce a more uniform product. A more particular object is to provide an improved machine which will embody a power drive having certain safety features which will avoid danger to the operator. In the illustrated machine, the construction is such that the molding surfaces are brought closely adjacent to each other by a light pressure, as by a treadle, and are then forced into effective molding engagement with the work by power. Thus, the likelihood of an operator getting his fingers or hand injured between molding surfaces which are brought by power all the way from open to closed position is eliminated. The invention also includes a device to prevent a sudden separation of the molding surfaces which might injure the machine or the operator and in the embodiment selected for illustration, this device consists of a cam controlled means for causing a movable mold or die to rise gradually.

Another object of the invention is to provide improved means to aid in stripping the work from the molding surfaces and, in the embodiment shown, a fluid medium, as air, is supplied to the molding surfaces of a pair of dies from a movable cylinder, the latter preferably being actuated by the mechanism which operates the dies.

A further object is to provide improved means to effect efficient operation of the machine with material having irregularities, particularly as to thickness. In the embodiment shown, a cushion block engages a movable die mounted so as to rock and compress the cushion block variably when uneven material is encountered. Means is also included to vary the pressure to which the material is to be subjected and preferably this is done by providing an adjusting screw to vary the initial pressure on the cushion block which engages the rocking die. The greater this initial pressure, the greater will be the ultimate pressure between the dies in molding position.

Other features and objects of the invention will be apparent from a consideration of the following description and claims in connection with the accompanying drawings, in which—

Fig. 1 is a front elevation of the machine as a whole;

Fig. 2 is a side elevation looking from the right of Fig. 1;

Fig. 3 is a vertical section taken on the line 3—3 of Fig. 1 looking in the direction of the arrows;

Figs. 4 and 5 are side elevations, partly in section, of portions of the machine, Fig. 4 showing the parts in normal position, and Fig. 5 showing the parts in the position assumed just before the power drive becomes operative;

Figs. 6 and 7 are perspective views of details.

On the frame-work 2, having upper bearings 4 and lower bearings 6, are mounted vertical slide rods 8 secured near their tops by a cross bar 10 pinned to the rods at 12. The lower ends of the slide rods 8 are connected by a cross bar 14 which is pinned to the rods at 16. Long helical springs 18 are interposed between the upper cross bar 10 and the bearings 6 on the frame-work and normally tend to hold the cross bar 10 in raised position. These helical springs pass through slots 20 and 22 in the frame-work.

An upper female die 24 is secured by plates 26 to the upper cross bar, these plates extending into slots 28 in the upper die and a turn button 30 pivoted at 32 can be swung down to engage a slot 34 in the upper die to secure it in position. Upon the upper die rests a steel bearing plate 36 and upon this rests a cushion block 38 preferably of rubber. Over the rubber cushion block 38 is a second bearing plate 40, and an adjusting screw 42 turned by a hand wheel 44 can be turned in the cross bar 10 to vary the pressure to which the work is to be subjected by varying the initial compression on the rubber cushion block 38. The slots 28 in the upper die together with the rubber cushion block will allow the die to rock or yield if it encounters inequalities in the work.

A lower male die 50 is secured to a casting 52 by bolts 54 and the casting 52 has depending arms 53 secured to the frame-work by bolts 56. The die 50 is preferably provided with heating means which may be of any suitable form (not shown). For depressing the upper female die a treadle 60 is used and this treadle is normally fulcrumed on a pin 76 the rear end of the treadle having a hook 74 engaging over the pin. The hook 74 and pin 76 are held in engagement by means of a rod 64 which bears with a spring pressure on the treadle at 62 as will later appear. Between the ends of the treadle, is a bearing portion 66 which engages the top surface of the lower cross bar 14 for the purpose of depressing the rectangular frame-work consisting of cross bars 14, 10 and rods 8. The treadle 60 is provided with an arc-shaped slot 70 which slides on a pin 68 in the frame-work, the pin 68 engaging a set screw 72 which at a certain stage in the operation becomes a fulcrum for the treadle. Upon depressing the treadle 60 the cross bar 14 and all the parts carried by it are brought down until the upper male die is nearly in closed position. When the set screw 72 meets the pin 68 further depression of the treadle actuates a double cone clutch hand power is applied to bring the dies into molding engagement, as will be referred to later. This construction provides means for bringing the dies close together with a light pressure on the treadle and the danger of the operator getting his hands caught, is avoided, as the power is not applied until the dies are substantially in engagement.

Mounted in the frame-work is a power shaft 80 carrying a loose pulley 82 which may be driven by a belt (not shown). This pulley is provided with a friction surface 84 adapted to be engaged by a friction surface 88 on a double cone clutch 86 which is keyed to the power shaft. A second friction surface 90 on the double cone clutch is adapted to engage a brake surface 92 on a brake drum 94 which is bolted to the frame-work by bolts 96 and 98. Movement of the double cone clutch 86 to the left as viewed in Fig. 1 connects the pulley 82 with the power shaft. The shaft is moved by the following mechanism: A screw 100 bears against the right-hand end of the power shaft and is carried by a lever 102 pivoted at 104 to the brake drum. At the opposite end the power shaft is engaged by a screw 106 carried on a lever 108 pivoted to the frame-work at 110. A rod 112 connects the lower arms of the levers 108 and 102. A long horizontal arm 114 extends inwardly from the lever 108 and is connected by a coiled spring 116 to a lug 118 on the frame-work. This spring acts through the long arm 114, lever 108, screw 106 to slide the power shaft 80 to the right and normally keeps the double cone clutch 86 in engagement with the brake drum 94. The treadle 60, when its fulcrum has been shifted to the pin 68 and set screw 72, acts through the rod 64 to raise the long horizontal arm 114 against the tension of the spring 116 and through the lever 108, rod 112, lever 102 and screw 100 to push the power shaft 80 to the left to connect the clutch by engagement of the surfaces 88 and 84.

Mounted on the power shaft 80 is a pinion 130 meshing with a large gear wheel 132 keyed to a shaft 134 which is mounted in bearings on the depending arms 53. Keyed to this shaft 134 are two eccentrics 136, the eccentrics being embraced by eccentric straps 139 carried on a pair of latch arms 138. These latch arms 138 have rearwardly projecting tripping projections 140 adapted to engage a trip bar 142 which is secured on the rearwardly projecting portion 141 of one of the depending arms 53. The lower ends of the arms 138 are connected by a latch bar 144 which is provided with a longitudinal slot 146 and a transverse slot 150. The slot 146 is intended to engage with a latch plate 148 bolted to the lower cross bar 14 and the transverse slot embraces a rib 152 also on the cross bar (Figs. 4, 5, 6 and 7). When the treadle has been depressed to lower the upper die nearly to its closed position, the depending arms 138 engage the latch plate 148 by means of the latch bar 144. Further depression of the treadle which connects up the power shaft will cause the eccentrics 136 to rotate and result in a further slight depression of the upper die and cross bar 14. When the eccentrics 136 have passed their dead center positions, the projections 140 on the latch arms 138 engage under the trip bar 142 to release the latch bar 144 and thereupon the cross bar 14 and upper die are free to rise under the tension of the helical springs 18, but in order to prevent too sudden rising of these parts the following mechanism is provided. Secured to the cross bar 14 and extending upwardly therefrom is a bracket 160 carrying a roller 162 adapted to engage a cam surface 164 on the gear wheel 132. This roller 162 follows the cam surface 164 and thus ensures a gradual rising of the bar 14 and connected parts.

Passing through the upper surface of the lower die 50 is an opening 170 which communicates through piping sections 172, 174, 176 and 178 with the upper surface of a lower fixed piston 180 secured by a cross rod 182 to the frame-work. The upper die has an opening 184 communicating through pipe 186 and a flexible pipe 188 with an upper piston 190 secured to a pin 192 on the frame-work. A vertically movable casting 200 slides in guides in the frame-work and carries an upper cylinder 202 and a lower cylinder 204 which embrace the pistons 190 and 180 respectively. The upper cylinder 202 has a guide slot 206 which is engaged by the pin 192 and the lower cylinder has a similar guide slot 208 engaged by the cross rod 182. It will be noted that the cylinders are closed above the slots for a purpose which will appear. Secured to the gear wheel 132 is a cam 210 provided with drop portions 212 and 214. On the cylinder casting 200 is a roller 216 which engages this cam 210 to hold the casting normally in raised position. When the upper die is about to be raised by the springs 18, the drop portion 212 of the cam 210 reaches the roller 216 which falls off the drop portion 212 and thus allows the two cylinders and their connected casting to fall. The cylinders will fall freely until the ends of the slots 206 and 208 reach the pistons 190 and 180 whereupon the air imprisoned in these pistons will be blown upwardly through the two piping systems which have been described and enter the molds between the molds and the leather, thus serving to prevent the atmospheric pressure from causing the leather to stick in the molds and also aiding in separating the molds.

The operation briefly is as follows: The work, which may be a strip of puttee leather in tempered condition, is placed over the hot mold 50 with its flesh side down. Upon depressing the treadle 60, the female die 24 is brought down nearly into engagement with the male die at which time the fulcrum of the treadle shifts from the pin 76 to the pin 68. Further depression of the treadle causes its rear end to push upwardly on the rod 64 and thus, through the connected mechanism, the power shaft 80 is clutched to the drive pulley. The latch plate 148 on the depressed cross bar 14 is now on a level with the latch bar 144 and the latch-bar 144 is carried into engagement with the latch plate as the latch arm 138 swings toward it by gravity. Rotation of the power shaft 80 now imparts rotation to the eccentrics 136 through the described gearing and as the eccentrics rotate, the latch arm 138 depresses the cross bar 14 still farther to bring the dies into molding engagement with the work. To stop the machine to allow the work to remain in position and become set, it is only necessary for the operator to remove his foot from the treadle. The spring 116 thereupon effects the operation of the double cone clutch 86 to separate it from the drive pulley and carry it into engagement with the brake drum 94. When the molding has been completed, the treadle is again depressed to connect up the clutch. The eccentrics 136 acting through the latch arm 138 raise the cross bar 14 slightly and when the tripping projection 140 meets the fixed bar 142, as indicated by dotted lines in Fig. 5, the latch arm is tripped to disengage the latch bar 144 and latch plate 148. When the dies are about to separate, the drop portion 212 of the cam 210 reaches the roller 216 on the cylinder casting 200 whereupon the cylinders drop freely until the slots 206 and 208 become closed by the pistons 190 and 180. The momentum acquired by the falling cylinders then causes a puff of air to be blown upwardly through the two systems of piping to the molding surfaces to aid in separating the work from the dies. The springs 18 then push upwardly on the upper cross bar 10 and the upward movement of the connected parts is rendered gradual by engagement of the cam roller 162 with the cam 164.

Having thus described my invention, what I claim as new and desire to secure by Letters Patent of the United States is:

1. In a molding machine, a die having a molding surface, a fixed piston, a movable cylinder, means to raise said cylinder and allow it to drop under the action of gravity, means to render said cylinder ineffective through a part of its movement, and connections from the molding surface to the interior of the cylinder whereby sudden flow of a fluid is supplied to the molding surface to separate the article from the die.

2. In a molding machine, a pair of molding surfaces, means for causing relative movement of the molding surfaces to carry the latter into and out of molding relation, and means, controlled by the moving means, to supply a fluid to the molding surfaces to aid in separating the surfaces and to remove therefrom a molded article.

3. In a molding machine, a pair of molds, means for moving one of the molds into and out of molding relation with the other, a cylinder and piston mounted for relative movement to create fluid pressure, connections from the interior of the cylinder to one of the molds, and means actuated by the mold moving means for causing relative movement of the piston and cylinder to supply said mold with fluid under pressure.

4. In a molding machine, a pair of relatively movable dies, fluid compressing mechanism having communication with the interior surface of a die to supply a fluid thereto, and means to render said fluid compressing mechanism effective and to cause relative separating movement of the dies substantially simultaneously.

5. In a molding machine, a fixed die, a movable die, means for moving said die, a movable cylinder having communication with one of the dies, a fixed piston in said cylinder, and means, controlled by said die moving means, for actuating said cylinder to supply one of said dies with a work stripping fluid.

6. In a molding machine, a fixed die, a movable die, a fixed piston, a movable cylinder, means to cause approaching movement of the piston and cylinder and to cause separating movement of the dies, and connections from the cylinder to the dies whereby the dies may be supplied with a fluid, the connection to the movable die having a flexible portion.

7. In a molding machine, a fixed piston, a movable cylinder, a molding surface, connections from the molding surface to the movable cylinder, and means to raise the movable cylinder and to allow it to drop to drive air to the molding surface.

8. In a molding machine, a fixed piston, a movable cylinder with a slot extending above the piston, a molding surface, connections from the molding surface to the interior of the movable cylinder, and means to drop the cylinder whereby the momentum acquired when the piston closes the slot serves to drive air to the molding surface.

9. In a molding machine, a pair of fixed pistons, a pair of connected cylinders, a pair of dies having molding surfaces, connections from each molding surface to one of the cylinders, and means to move the connected cylinders to supply a fluid to the molding surfaces.

10. In a molding machine, a pair of fixed pistons, a pair of connected cylinders, a fixed die and a movable die, connections from the molding surfaces of the dies to the interior of the cylinders, the connection from the movable die having a flexible portion, and means to move the cylinders to force a fluid to the dies.

11. In a molding machine, a male die, a female die, said dies being relatively movable, means for loosely supporting one of said dies, a yielding member engaging the said die, the member and the die being so supported and arranged that the latter may rock and adjust itself to irregularities in the material, and means to move one of the dies into work contacting position.

12. In a leather molding machine, a fixed die, a movable die, a rubber cushion block engaging the movable die over substantially the whole width, and means readily to adjust the initial tension of the cushion block.

13. In a molding machine, a male die, a female die, one of said dies being mounted to rock when uneven material is encountered, a cushion block engaging said rockable die, and means to compress variably the cushion block, to regulate the pressure between the dies.

14. In a molding machine, a fixed die, a movable cross bar, plates carried thereby, a second die having slots engaged by the plates and a cushion block engaging the second die to allow it to yield when it meets irregularities in the material.

15. In a molding machine, a cross bar, guide plates thereon, a slotted die engaging the guide plates and a latch on the cross bar to lock the die removably to the cross bar.

16. In a molding machine, a power drive, a treadle, a fixed die, a movable die, means to hold the dies normally out of engagement, means whereby a light initial pressure on the treadle will nearly engage the dies, and means whereby a continued pressure on the treadle will connect the power drive to the movable die to carry it to molding position.

17. In a molding machine, a power drive, a pair of normally spaced dies mounted for relative sliding movement, manual means to cause a relative sliding movement to bring the dies into approximate contact and thereafter to connect them to the power drive to effect engagement under pressure.

18. In a molding machine, a fixed die, a movable die, a cross bar carrying the movable die slidably mounted in the machine, a spring engaging the cross bar to hold the movable die raised, manual means for depressing the cross bar against the tension of the spring whereby a light pressure will serve to carry the movable die approximately into contact with the fixed die, and means to apply a heavy pressure to the movable die to carry it to molding position.

19. In a molding machine, a power drive, a pair of dies, means whereby a light pressure will bring the dies into approximate contact, and means to apply a heavy pressure from the power drive to effect molding engagement of the dies.

20. In a molding machine, a fixed die, a movable die, means to maintain said dies in alinement, a spring to hold the movable die away from the fixed die, a power drive, a treadle to move the movable die into approximate contact with the fixed die, and then to connect the power drive to the movable die.

21. In a molding machine, a pair of separable dies, a power drive, a lever having changeable fulcrums, and means for swinging the lever on one fulcrum to bring the dies close together and for swinging it on another fulcrum to cause the power drive to force the dies into molding contact.

22. In a molding machine, a pair of separable dies, a power drive, a lever mounted to swing around a fulcrum pin at one end to move the dies close together, a second fulcrum pin between the ends of the lever, a lost motion connection between said pin and lever, and means for maintaining the lever against the first fulcrum pin with a light pressure, said means allowing the lever to swing around the second fulcrum pin to connect the power drive to the dies.

23. In a molding machine, a fixed die, a movable die, a spring to hold the movable die away from the fixed die, a driven shaft, means to connect the driven shaft to the movable die to operate the movable die against the tension of the spring, said means including a latch arm, means to trip the latch arm, and a cam to ensure gradual return of the movable die.

24. In a molding machine, a fixed die, a movable die, means normally to hold the dies separated, a driven shaft, a latch arm actuated by the shaft, means to connect the latch arm to the movable die to bring the dies into molding engagement, and means for automatically releasing the movable die from the latch arm.

25. In a molding machine, a fixed die, a movable die, means to move the movable die normally away from the fixed die, a driven shaft, connections from the driven shaft to operate the movable die, and cam controlled means to cause gradual return of the movable die.

26. In a molding machine, a fixed die, a movable die, a spring to hold the movable die away from the fixed die, a driven shaft, means to connect the driven shaft to the movable die, means automatically to disconnect the movable die from the driven shaft, and a stop to prevent sudden rising of the movable die.

27. In a molding machine, a frame, a fixed die on the frame, rods slidable in the frame, cross bars connecting the rods, a movable die carried by one of the cross bars, and springs engaging said cross bar and the frame to raise the movable die.

In testimony whereof I have signed my name to this specification.

THOMAS H. SEELY.